(No Model.)
W. P. CHAPLINE, J. P. DUTTON & J. E. CAMPBELL.
FILTER.
No. 438,060.           Patented Oct. 7, 1890.
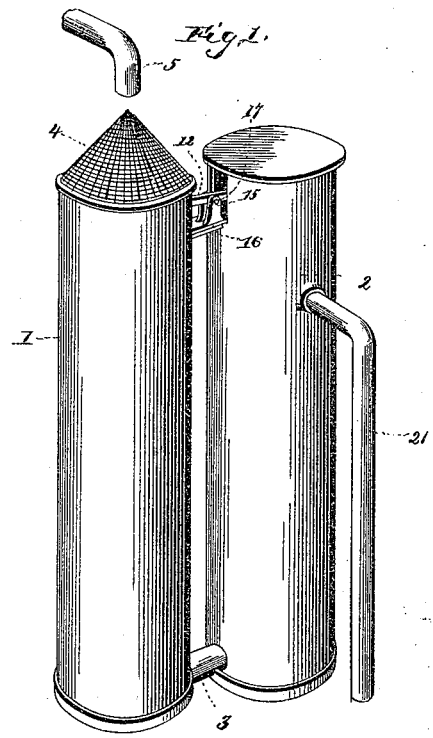
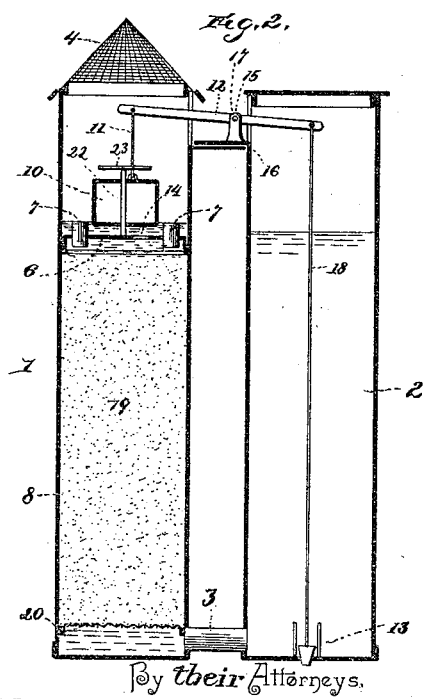
Witnesses
Inventors
W. P. Chapline,
J. P. Dutton, and
J. E. Campbell.
By their Attorneys.

UNITED STATES PATENT OFFICE.

WILLIAM P. CHAPLINE, JOHN P. DUTTON, AND JAMES E. CAMPBELL, OF HIGGINSVILLE, MISSOURI.

FILTER.

SPECIFICATION forming part of Letters Patent No. 438,060, dated October 7, 1890.

Application filed May 31, 1890. Serial No. 353,768. (No model.)

*To all whom it may concern:*

Be it known that we, WILLIAM P. CHAPLINE, JOHN P. DUTTON, and JAMES E. CAMPBELL, citizens of the United States, residing at Higginsville, in the county of Lafayette and State of Missouri, have invented a new and useful Filter, of which the following is a specification.

The invention relates to improvements in filters.

The object of the present invention is to provide a simple and inexpensive filter capable of automatically draining itself after the flow of water has ceased and adapted to be readily cleaned and have its filtering material removed and replaced by new material when desired.

The invention consists in the construction and novel combination and arrangement of parts hereinafter fully described, illustrated in the accompanying drawings, and pointed out in the claims.

In the drawings, Figure 1 is a perspective view of a filter. Fig. 2 is a central vertical longitudinal sectional view.

Referring to the accompanying drawings, 1 and 2 designate similar cylindrical vessels of a filter, which are secured together and communicate at their lower ends by a tube 3. The cylindrical vessel 1 is provided at its upper end with a removable wire-gauze screen or sieve 4, which is conical and is adapted to prevent the entrance of foreign matter gathered by the water in its passage through a spout 5, which has its exit or outlet opening arranged above the screen 4 of the filtering-chamber. The cylindrical vessel 1 is provided with a diaphragm 6, arranged a short distance from the upper end of the chamber and provided with vertical tubes 7, that extend a short distance from the diaphragm and provide passages for the water to enter a filtering-chamber 8, provided with suitable filtering material. Before the water enters the filtering-chamber through the tubes 7 it partially rises in the upper chamber 9 sufficiently to raise a float 10, connected by a rod or piston 11 with one end of a lever 12, that has its other end connected to a drain-valve 13, whereby when water is passing through the filter the drain-valve will be closed, but as soon as the flow ceases the water in the upper chamber 9 drains through an opening 14 in the diaphragm and causes the float to fall and open the drain-valve and permit the sediment and water left in the filter to drain therefrom, and it will be seen that the filter is automatic in its operation. The lever 12 is fulcrumed in suitable ears 15 of a plate 16, that connects the cylindrical vessel together, and the latter are provided with oppositely-disposed openings 17, and the connecting-plate 16 can be conveniently formed of the metal cut from the vessel. The end of the lever arranged in the reservoir or cylindrical vessel 2 is connected by a rod or similar means 18 with the drain-valve 13, and when the float is raised the valve is closed, and vice versa.

The filtering material 19 is arranged in the chamber 8 between the diaphragm 6 and the foraminous partition or bottom 20, and the water after percolating through the filtering material passes through the tube 3 into the reservoir 2 and out through an outlet-pipe 21, arranged near the upper end of the reservoir. The float 10 preferably consists of a cylindrical vessel guided on a rod 22, which has one end secured to the diaphragm and the other end provided with a disk or stop 23, that limits the movement of the float and prevents the valve being jammed. When it is desired to change the filtering material 19, the diaphragm 6 can be readily removed and access had to the filtering-chamber, and by this means the filter can be kept continually clean.

It will readily be seen that the filter is simple in construction and is adapted to automatically drain itself after every flow of water.

Having thus described our invention, we claim—

1. In a filter, the combination of the vessels communicating at their lower ends, the diaphragm provided with the openings 14 and the vertical tubes 7, the drain-valve, and the float arranged upon the diaphragm and connected with the drain-valve, substantially as described.

2. In a filter, the combination of the vessels 1 and 2, communicating at their lower ends, the diaphragm arranged in the upper portion 1 and provided with the opening 14 and the vertical tubes 7, the lever 12, fulcrumed between the vessels and having an end arranged within each, the drain-valve arranged at the bottom of the vessel 2 and connected with the end of the lever, and the float arranged in the vessel 1 and connected with the adjacent end of the lever, substantially as and for the purpose described.

3. In a filter, the combination of the vessels 1 and 2, having their lower ends communicating, the foraminous partition 20, arranged at the bottom of the vessel 1, the diaphragm arranged in the upper portion of the vessel and provided with the tubes 7 and the opening 14, the drain-valve arranged at the bottom of the vessel 2, the lever fulcrumed between the vessel and having one end connected with the drain-valve, the float arranged upon the diaphragm and connected with the other end of the lever, the guide-rod, and the stop to limit the movement of the float, substantially as described.

4. In a filter, the combination of the vessels 1 and 2, having their lower ends communicating, the removable conical gauze top 4, arranged at the upper end of the vessel 1, the foraminous partition 20, arranged at the bottom of the vessel 1, the diaphragm arranged at the upper portion of the vessel and provided with the tubes 7 and the opening 14 and forming a filter-chamber, the filtering material arranged in the chamber, the drain-valve, and the float arranged upon the diaphragm and connected with the drain-valve, substantially as described.

In testimony that we claim the foregoing as our own we have hereto affixed our signatures in presence of two witnesses.

WILLIAM P. CHAPLINE.
    JOHN P. DUTTON.
    J. E. CAMPBELL.

Witnesses:
 GROW YOUNG,
 C. VIVION.